(12) United States Patent
Lim et al.

(10) Patent No.: US 6,410,465 B1
(45) Date of Patent: Jun. 25, 2002

(54) COMPOSITE SHEET MATERIAL

(75) Inventors: Hyun Sung Lim, Midlothian, VA (US); George Joseph Ostapchenko, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/421,135

(22) Filed: Oct. 19, 1999

Related U.S. Application Data

(60) Provisional application No. 60/137,506, filed on Jun. 2, 1999.

(51) Int. Cl.$^7$ ............................ B32B 5/26; B32B 27/12; B32B 27/02

(52) U.S. Cl. ................ 442/389; 442/76; 442/327; 442/334; 442/335; 442/337; 442/381; 442/392; 442/394; 442/395; 442/396; 428/397; 604/358; 604/367; 604/370; 156/305; 156/321; 156/322

(58) Field of Search ..................... 442/76, 327, 334, 442/335, 337, 381, 389, 392, 394, 395, 396; 428/397; 604/358, 367, 370

(56) References Cited

U.S. PATENT DOCUMENTS

| | | | |
|---|---|---|---|
| 3,912,542 A | 10/1975 | Hirano et al. ............... 156/104 |
| 3,914,488 A | 10/1975 | Gorrafa ..................... 428/397 |
| 4,123,211 A | 10/1978 | Rudloff ..................... 425/82.1 |
| 4,725,473 A | 2/1988 | Van Gompel et al. ...... 428/156 |
| 4,725,481 A | 2/1988 | Ostapchenko ............... 428/213 |
| 4,739,012 A | 4/1988 | Hagman ..................... 525/92 |
| 4,845,583 A | 7/1989 | Zimmerman et al. ....... 360/133 |
| 4,857,065 A | 8/1989 | Seal .......................... 604/368 |
| 4,868,062 A | 9/1989 | Hoeschele et al. .......... 428/423 |
| 4,961,974 A | 10/1990 | Jones ........................ 428/34.2 |
| 5,006,183 A | 4/1991 | Fleissner ................... 156/62.2 |
| 5,439,737 A | 8/1995 | Trabelsi ................... 428/317.7 |
| 5,445,874 A | 8/1995 | Shehata ..................... 428/252 |
| 5,669,798 A | 9/1997 | Koczab ..................... 442/362 |
| 5,695,868 A | 12/1997 | McCormack ............... 428/283 |
| 5,800,928 A | 9/1998 | Fischer et al. .............. 428/500 |
| 5,938,648 A | * 8/1999 | LaVon et al. ............... 604/358 |
| 5,993,589 A | * 11/1999 | Morman ................... 156/229 |
| 6,008,149 A | * 12/1999 | Copperwheat ............. 442/381 |

FOREIGN PATENT DOCUMENTS

| | | | |
|---|---|---|---|
| EP | 0 560 630 B1 | 11/1998 | .......... B32B/27/34 |
| WO | 97/45259 | 12/1997 | .......... B32B/27/12 |
| WO | 98/54389 | 12/1998 | .......... D04H/13/00 |
| WO | 99/25551 | 5/1999 | ............ B32B/3/26 |
| WO | 99/28129 | 6/1999 | .......... B32B/27/12 |

\* cited by examiner

*Primary Examiner*—Terrel Morris
*Assistant Examiner*—Ula C. Ruddock

(57) ABSTRACT

A moisture vapor permeable, substantially liquid impermeable composite sheet material includes a powder-bonded nonwoven web adhered to a moisture vapor permeable thermoplastic film. The nonwoven web includes a first layer comprised primarily of fibers that are compatible with an adhesive used to bond the web, and a second layer comprised of a blend of fibers, some of which are compatible with, and some of which are incompatible with the bonding adhesive and the thermoplastic film. A method for making the composite sheet material and an item of apparel made from the sheet material are also provided.

18 Claims, 2 Drawing Sheets

COMPOSITE SHEET MATERIAL

This application claims benefit of priority from Provisional application No. 60/137,506, filed on Jun. 2, 1999.

FIELD OF THE INVENTION

This invention relates to a moisture vapor permeable, substantially liquid impermeable composite sheet structure useful in apparel, surgical drapes, sterile wraps, packaging materials, protective covers, construction materials, and personal care absorbent articles such as diapers and sanitary napkins. More particularly, the invention is directed to a thin moisture vapor permeable film and a multiple layer fibrous substrate that combine to form a composite sheet that is durable, strong, and flexible, that acts as a barrier to liquids, bacteria, viruses and odors, and yet is also highly permeable to moisture vapor.

BACKGROUND OF THE INVENTION

Various woven and nonwoven sheet materials used in making medical drapes, medical gowns and absorbent articles, such as diapers and sanitary napkins, must be comfortable, soft, pliable and substantially liquid impermeable. The sheet materials used in medical apparel and absorbent articles function to contain the discharged materials and/or to isolate these materials from the body of the wearer or from the wearer's garments and bed clothing. As used herein, the term "absorbent article" refers to devices which absorb and contain body exudates, and, more specifically, refers to devices which are placed against or in proximity to the body of the wearer to absorb and contain the various exudates discharged from the body. Absorbent articles include disposable diapers, incontinence briefs, incontinence undergarments, incontinence pads, feminine hygiene garments, training pants, pull-on garments, and the like.

An ideal sheet material for use in medical apparel and absorbent articles will exhibit a high moisture vapor transmission rate that will reduce the build up of heat and humidity inside garments and articles made from the material. The ideal sheet material will also exhibit excellent barrier properties so as to prevent the passage or seepage of fluids, and will even prevent the passage of bacteria and viruses. The ideal material must also be strong enough so that it does not rip or delaminate under normal usage conditions regardless of whether the material is dry or wet. Where the sheet material is to be used in apparel, it is also important that the material be flexible, soft and drapable. Finally, where the sheet material is to be used in medical apparel, it is important that the sheet not generate fiber lint that might contaminate a medical environment.

PCT Publication No. WO 97/45259, which is hereby incorporated by reference, discloses a breathable composite sheet material comprised of a moisture vapor permeable thermoplastic film adhered to a fibrous substrate. The breathable thermoplastic film is primarily comprised of a polymer material selected from the group of block copolyether esters, block copolyether amides and polyurethanes. The fibrous substrate is a nonwoven sheet made primarily of a polymer fibers that are not compatible with the film, such as a polyolefin fibers. The film is adhered to the fibrous substrate by extruding a layer of the molten film-forming polymer directly onto the fibrous substrate and then mechanically engaging the film and the fibers of the substrate, as for example by pressing the molten film into the fibrous substrate in a nip formed between two rolls.

U.S. Pat. No. 5,445,874 discloses a waterproof, bloodproof and virus-proof laminate material suitable for use in protective apparel. The laminate is comprised of a moisture vapor permeable film adhered to a woven or nonwoven fabric. The preferred film is a thermoplastic polyester elastomer. The disclosed fabrics include nonwoven fabrics of polyester, nylon and polypropylene. U.S. Pat. No. 5,445,874 discloses that the film can be laminated to the fabric by powder adhesive lamination, hot melt lamination, or wet adhesive lamination.

Adhesive lamination, thermal lamination and extrusion coating methods have all been used to produce composite sheets of a fibrous nonwoven substrate and a moisture vapor permeable, substantially liquid impermeable film. It has been possible to make such composite sheets with good barrier properties so long as the moisture vapor permeable film is relatively thick (i.e., >25 microns). However, it has been difficult to make such composite sheets with thinner films without sacrificing important barrier properties. Very thin moisture vapor permeable films are desirable in a composite sheet because thinner films facilitate greater flux of moisture vapor through the composite sheet and because thinner films use less of the film material and are accordingly less expensive to produce.

Adhesive lamination is carried out in a post film formation step. For adhesive lamination to be feasible, the moisture vapor permeable film must have enough tensile strength and tear strength so that the film can be formed, wound onto a roll, and later unwound and handled during the adhesive lamination process. It is difficult to handle moisture vapor permeable films less than 25 microns (1 mil) in thickness during the adhesive lamination process without tearing the film or introducing defects into the film.

Thermal lamination of moisture vapor permeable films less than 25 microns thick has similarly resulted in composite sheet materials with inadequate barrier properties. When composite sheets are made by thermally laminating a thin film to a fibrous substrate, the thin film handling problems associated with adhesive lamination, as described above, are encountered. In addition, to carry out a thermal lamination, the film must be subjected to elevated temperatures and pressures so as to soften the film and force it into mechanical engagement with the fibrous substrate. Generally, the peel strength between the film and the fibrous substrate increases with increasing lamination temperatures and increasing nip pressures. Unfortunately, when moisture vapor permeable films with a thickness of less than 25 microns are subjected to the increased temperatures and pressures needed to obtain adequate peel strength in the composite sheet, small holes develop in the film such that the composite sheet does not exhibit the fluid barrier properties desired in a composite sheet for use in absorbent articles or medical apparel. These defects can result from non-uniform temperatures throughout the web during bonding or from high nip pressures.

A composite sheet with excellent tensile and peel strength, that does not emit loose fibers, can be produced using a carded web of staple fiber that is powder bonded with an adhesive that is compatible with the fibers of the web. The composite sheet is produced by extrusion coating the powder-bonded web with a molten thin film that is also compatible with the fibers of the web and the powder adhesive. "Compatibility" of thermoplastic materials is an art-recognized term that refers, generally, to the degree to which the thermoplastic materials are miscible with each other and/or interact with each other. "Incompatible" materials, as used herein, means materials that are substantially immiscible with each other or do not interact with each other. Incompatible materials do not wet or adhere well to each other, even when heated. As used herein, "compatible" materials are materials that are not "incompatible" with each other, as defined above. For purposes of this application, a fiber is deemed to be compatible with a synthetic adhesive or with another polymer if the adhesive or other polymer is miscible with material that comprises the majority of the fiber and if the adhesive or other polymer readily wets the fiber or if the adhesive or polymer can adhere well to the fiber.

A composite sheet, made from a powder-bonded web that has been extrusion coated with a film of a thermoplastic polymer compatible with the fibers of the web and the solidified powder adhesive, exhibits good tensile strength and low linting because the solidified powder adhesive binds all of the fibers in the web into a strong matrix. These sheets exhibit excellent peel strength because the film readily adheres to the compatible adhesive and fibers of the web. For example, excellent tensile strength, peel strength and linting resistance can be obtained where the film, the nonwoven and the adhesive are all comprised of polyester polymers. Unfortunately, the film layer in composite sheets of this type is so thoroughly and completely bonded to the nonwoven that the sheet has a stiff paper-like feel that is unsuitable for apparel or many kinds of absorbent articles.

Accordingly, there is a need for a composite sheet material that acts as a barrier to fluids, bacteria and viruses, yet is also highly permeable to moisture vapor. Such a moisture vapor permeable, fluid impermeable composite sheet material should be durable, strong, and low linting, while at the same time being soft, flexible and comfortable enough for use in apparel products and absorbent articles. There is a further need for such a composite sheet that can be produced in an economical fashion, i.e., film extrusion and lamination in one process.

SUMMARY OF THE INVENTION

The invention provides a moisture vapor permeable, substantially liquid impermeable composite sheet material. The sheet material comprises a first fibrous nonwoven web having a first side and an opposite second side, and a second fibrous nonwoven web having a first side and an opposite second side. The first side of the second fibrous nonwoven web abuts the second side of the first fibrous nonwoven web, and the first and second fibrous nonwoven webs each are powder-bonded webs wherein the fibers of the first and second fibrous webs are bonded to the other fibers of such web by a synthetic adhesive permeating the first and second nonwoven fibrous webs. The first and second fibrous nonwoven webs are bonded to each other by the adhesive. A moisture vapor permeable thermoplastic film is bonded to the second side of the second fibrous nonwoven web. At least 90 weight percent of the fibers in the first fibrous nonwoven web are compatible with the adhesive, between 25 and 75 weight percent of the fibers in the second fibrous nonwoven web are compatible with the adhesive and the thermoplastic film, and between 75 and 25 weight percent of the fibers in the second fibrous nonwoven web are incompatible with the adhesive and the thermoplastic film. At least 50 weight percent of the polymer in the thermoplastic film is also compatible with the adhesive.

Preferably, the weight of the fibers in the second nonwoven fibrous web is between ¼ and 4 times the weight of the fibers in the first nonwoven fibrous web. It is also preferred that the film of the composite sheet have an average thickness of less than 25 microns, and more preferably less than 20 microns. The composite sheet ideally exhibits a peel strength of at least 0.1 N/cm, a hydrostatic head of at least 60 cm, and a moisture vapor transmission rate, according to the LYSSY method, of at least 1000 g/m$^2$/24 hr.

According to a preferred embodiment of the invention, the adhesive in the nonwoven web is a polyester polymer or polyester copolymer adhesive, and the moisture vapor permeable film is comprised of at least about 75% by weight of polymer selected from the group of block copolyether esters, block copolyether amides, copolyether imide esters, polyurethanes, polyvinyl alcohol, and combinations thereof. In the preferred embodiment, at least 90 weight percent of the fibers in the first fibrous nonwoven web are made of polymer selected from the group of polyester polymers and copolymers, between 25 and 75 weight percent of the fibers in the second fibrous nonwoven web are made of polymer selected from the group of polyester polymers and copolymers, and between 75 and 25 weight percent of the fibers in the second fibrous nonwoven web are made of polymer selected from the group of polyamides, polyolefins, acrylics, and cotton. The polyester polymers and polyester copolymers in the fibers of the preferred embodiment are preferably selected from the group of poly(ethylene terephthalate), poly(1,3-propylene terephthalate) and copolymers thereof. At least 10% of such polyester fibers may be shaped fibers having a scalloped-oval cross-section. According to a preferred embodiment of the invention, the moisture vapor permeable film is comprised of at least about 75% by weight of block copolyether esters, and more preferably the film consists essentially of a copolyether ester elastomer.

The composite sheet of the invention is substantially free of pinholes, and substantially no liquid passes through the sheet when tested according to the liquid seepage test. It is further preferred that the composite sheet prevent the passage of microbes when tested according to the ISO 11607 standard for sterile packaging materials and that the composite sheet prevents the passage of microbes and viruses with a diameter greater than 0.025 microns when tested according to ASTM F1671.

The moisture vapor permeable film of the composite sheet of the invention may have first and second layers, each of which are comprised of a different moisture vapor permeable thermoplastic polymer composition. The first layer of such a moisture vapor permeable film may comprise at least 75% of the total weight of the film and may comprise a substantially hydrophilic layer, while the second layer of the moisture vapor permeable film may comprise a substantially hydrophobic layer, wherein the first layer of the moisture vapor permeable film is bonded to the second side of the second fibrous nonwoven web.

The present invention is also directed to an item of apparel or a protective cover comprising the composite sheet material described above.

The present invention also includes a method for making a moisture vapor permeable, substantially liquid impermeable composite sheet comprising a fibrous nonwoven bonded with a powder adhesive and adhered to a moisture vapor permeable thermoplastic film. The method includes the steps of: (a) providing a first fibrous nonwoven web having a first side and an opposite second side, at least 90 weight percent of the fibers in the first fibrous nonwoven web being compatible with a powder adhesive; (b) providing a second fibrous nonwoven web having a first side and an opposite second side, and abutting the first side of the second fibrous nonwoven web with the second side of the first fibrous nonwoven web, between 25 and 75 weight percent of the fibers in the second fibrous nonwoven web being compatible with the adhesive and the thermoplastic film, and between 75 and 25 weight percent of the fibers in the second fibrous nonwoven web being incompatible with the adhesive and the thermoplastic film; (c) permeating the adhesive throughout the first and second fibrous nonwoven webs; (d) heating the web to a temperature sufficient to melt the adhesive and powder-bond the webs in a manner such that the fibers of the first and second fibrous webs are bonded to the other fibers of such respective webs by the adhesive permeating the first and second nonwoven fibrous webs, and the first and second fibrous nonwoven webs are bonded to each other by the adhesive; (e) melt extruding the moisture vapor permeable thermoplastic film onto the second side of the second fibrous nonwoven web to form composite sheet; (f) subjecting the composite sheet material to a confining pressure by passing the composite sheet material through a nip; and (g) collecting the composite sheet onto a roll.

BRIEF DESCRIPTION OF THE DRAWINGS

The accompanying drawings, which are incorporated in and constitute a part of this specification, illustrate the presently preferred embodiments of the invention and, together with the description, serve to explain the principles of the invention.

DETAILED DESCRIPTION

Reference will now be made in detail to the presently preferred embodiments of the invention, examples of which are illustrated below.

The composite sheet of the invention is comprised of a moisture vapor permeable film adhered to a fibrous substrate. Such composite sheets are sometimes referred to as laminate structures. Preferably, the fibers of the fibrous substrate are carded staple fibers held together by an adhesive that is applied to the web as a powder and subsequently heated so as to bind the fibers into a fiber/adhesive matrix. The preferred film is a moisture vapor permeable thermoplastic film that can be extrusion coated as a melt directly onto the fibrous web in a manner such that a thin film adheres to the fibers of the web and to the adhesive that has been incorporated into the web.

It has been found that a composite sheet comprised of a film thermally laminated to a fibrous matrix can be made softer and more flexible if a substantial portion of the fibers in the fibrous substrate are made of a polymer that is not readily compatible with the polymer in the film and the adhesive. Unfortunately, laminate structures in which a substantial portion of fibers of the web are incompatible with the adhesive used to bind the fibers of the web have substantially reduced tensile strength and they tend to give off loose fibers.

The present invention is directed to a soft and flexible composite sheet with excellent tensile strength and resistance to fiber linting. According to the invention, the fibrous web of the composite sheet has at least two layers. A first layer is comprised of fibers in which at least 90 weight percent of the fibers are compatible with the adhesive used to bind the fibers of the web. A second layer of fibers deposited on the first layer of fibers is comprised of a blend of fibers in which between 25 to 75 weight percent of the fibers are incompatible with the adhesive used to bind the fibers of the web and between 75 and 25 weight percent of the fibers are compatible with the adhesive. The composite sheet further includes a thin moisture vapor permeable film that is extrusion coated directly onto the exposed surface of the second layer, which film is comprised of at least 50 weight percent of a thermoplastic polymer that is compatible with the adhesive used to bind the fibers of the web.

Figure 1:
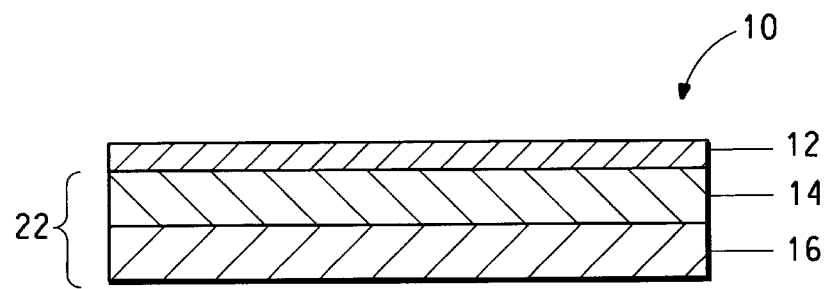
FIG. 1 is a cross-sectional view of the composite sheet structure of the invention.

Referring to FIG. 1, the composite sheet 10 of the current invention is shown. Sheet 10 comprises a moisture vapor permeable multi-layer nonwoven web 22 comprising fibrous nonwoven layers. A first nonwoven layer 16 abuts a second nonwoven layer 14. A powder adhesive introduced into the multi-layer web bonds the fibers within each layer to each other and bonds the fibrous layers 14 and 16 to each other. The fibers in the first nonwoven layer preferably comprise between 20 and 80 percent, by weight, of the fibers in the multi-layer web. The fibers in the second nonwoven layer also preferably comprise between 80 and 20 percent, by weight, of the fibers in the multi-layer web. More preferably, the fibers of the first nonwoven layer comprise between 40% and 75% by weight of the fibers in the multi-layer web, and the fibers of the second nonwoven layer comprise between 75% and 25% by weight of the fibers in the multi-layer web. A liquid impermeable, moisture vapor permeable polymer film 12 is extrusion coated onto the second nonwoven layer 14. Film 12 can be a single layer or multi-layer film.

The second nonwoven layer 14 is preferably a carded web comprising a blend of first and second staple fiber components. The first staple fiber component is comprised of fibers made of material that is compatible with the polymers of both the moisture vapor permeable film layer and the powder adhesive. The second staple fiber component is comprised of fibers made of another material that is incompatible with the polymer of film layer 12 and the powder adhesive. Preferably, the first and second staple fiber components are each synthetic polymers. The compatible staple fiber component of the second nonwoven layer 14 preferably comprises between about 25 and 75 weight percent of the fibers of the second nonwoven layer, and more preferably between about 40 and 60 weight percent of the fibers of the second nonwoven layer. According to alternative embodiments of the invention, the first compatible staple fiber component may comprise a mixture of two or more types of fibers that are each made of a polymer that is compatible with the adhesive, it may comprise fibers made from blends of polymers that are compatible with the adhesive, or it may comprise some mixture of the two. Likewise, the incompatible second staple fiber component of the second nonwoven layer 14 may comprise a mixture of two or more types of fibers that are each made of a polymer that is incompatible with the adhesive, it may comprise fibers made from blends of polymers that are incompatible with the adhesive, or it may comprise some mixture of the two. The second nonwoven film layer 14 may alternatively be comprised of two or more sub-layers, each of which are comprised of between 25 and 75 weight percent of the compatible staple fiber component and between 75 and 25 weight percent of the incompatible staple fiber component.

At least 90 weight percent of the staple fibers in the first nonwoven layer 16, and more preferably between 95 and 100 weight percent of the staple fibers in the first nonwoven layer 16, are made of a material that is compatible with both the powder adhesive and the first staple fiber component of the second nonwoven layer. The staple fibers of the first nonwoven layer 16 may be identical to the compatible first staple fiber component of the second nonwoven layer 14. The first nonwoven fiber layer 16 may alternatively be comprised of two or more sub-layers, each of which are comprised of at least 90 weight percent of fibers made of materials that are compatible with the powder adhesive and the first staple fiber component of the second nonwoven layer. Preferably, the staple fibers of the first nonwoven layer 16 are comprised of synthetic polymers.

The powder adhesive that is used to powder-bond the nonwoven layers is comprised of a thermoplastic polymer that melts at a temperature below the melting point of the staple fibers used in the fibrous nonwoven layers. The powder adhesive is compatible with the film layer, the first staple fiber component of the second nonwoven layer 14, and the staple fibers of the first nonwoven layer 16 so as to provide good adhesive bonding with the compatible fibers and the film layer when applied. The adhesive is distributed, in powder form, throughout both the first and second nonwoven layers to provide bonding both within and between the nonwoven layers when the nonwoven layers are heated.

The fiber blend in the second nonwoven layer 14 gives rise to discrete bonding between the fibrous web and the film layer 12. This discrete bonding results because the incompatible fibers do not bond well with the film layer whereas the compatible fibers do. This discrete bonding improves the drapeability of the fabric, provides a more fabric-like texture versus film-like or paper-like texture, and results in a fabric that is softer, more flexible, and less noisy than composite sheets where the nonwoven substrate is comprised primarily of fibers that are compatible with the film layer. These properties are particularly desirable for apparel and absorbent article end uses. Because the powder adhesive does not bond well to the incompatible fiber component of the second nonwoven layer 14, the strength of the second nonwoven layer alone would tend to be lower than is desired for many end uses. However, because the powder adhesive is compatible with at least 90 weight percent of the fibers of the first nonwoven layer 16, good adhesive bonding is achieved throughout the first nonwoven layer of the web. This results in a composite sheet that exhibits good overall strength and durability (e.g. abrasion resistance). In addition, good adhesive bonding is obtained between the first and second nonwoven layers.

Film layer 12 of the composite sheet structure 10 is a moisture vapor permeable and substantially liquid impermeable film. The film layer is preferably extruded and laminated onto the fibrous substrate 22 in a single process. Film layer 12 comprises a thermoplastic polymer material that can be extruded as a thin, continuous, nonporous, substantially liquid impermeable, moisture vapor permeable film. Preferably, the extruded film is less than 25 microns thick, and more preferably less than 15 microns thick, and most preferably less than 10 microns thick. The film layer 12 is preferably comprised of a block polyether copolymer such as a block polyether ester copolymer, a polyetheramide copolymer, a polyurethane copolymer, a poly(etherimide) ester copolymer, polyvinyl alcohols, or a combination thereof. Preferred copolyether ester block copolymers are segmented elastomers having soft polyether segments and hard polyester segments, as disclosed in Hagman, U.S. Pat. No. 4,739,012. Suitable copolyether ester block copolymers are sold by DuPont under the name Hytrel®. Hytrel® is a registered trademark of DuPont. Suitable copolyether amide polymers are copolyamides available under the name Pebax® from Atochem Inc. of Glen Rock, N.J. USA. Pebax® is a registered trademark of Elf Atochem, S.A. of Paris, France. Suitable polyurethanes are thermoplastic urethanes available under the name Estane® from The B. F. Goodrich Company of Cleveland, Ohio, USA. Suitable copoly(etherimide) esters are described in Hoeschele et al., U.S. Pat. 4,868,062.

Alternatively, the film layer 12 may be comprised of a blend of polymers in which at least 50% by weight of the film is comprised of polymers that are incompatible with the adhesive used to bind the fiber of the web 22. More preferably, the film layer 12 is comprised of at least 75% by weight of polymers selected from the group of block copolyether esters, block copolyether amides, copolyether imide esters, polyurethanes, and polyvinyl alcohol.

The compatible fibrous components of the second nonwoven layer 14 and the fibers of the first nonwoven layer 16 preferably comprise a polyester such as poly(ethylene terephthalate), poly(1,3-propylene terephthalate) and copolymers thereof. Such polyester polymers are compatible with block polyether copolymers such as a block polyether ester copolymers, with polyetheramide copolymers, with polyurethane copolymers, with poly(etherimide) ester copolymers, and with combinations thereof. The incompatible fibrous components of the second nonwoven layer 14 are preferably polyamides such as poly(hexamethylene adipamide) (nylon 66) and polycaproamide (nylon 6), polyolefins such as polypropylene or polyethylene, acrylic polymers, or cotton. Preferred nonwoven materials for the second nonwoven layer 14 of the fibrous web 22 include blends of polyolefin and polyester fibers and blends of polyamide and polyester fibers. One type of polyester fiber that can be used in the first and/or second nonwoven layers of the fibrous web 22 are shaped polyester fibers, such as shaped polyester fibers with a scalloped-oval cross-section as disclosed in U.S. Pat. 3,914,488 to Garrafa (assigned to DuPont), which is hereby incorporated by reference. It is believed that where the polyester fibers comprise at least 10% of such shaped fibers, channels are created in the fibrous substrate through which moisture vapor can be more efficiently conveyed through the composite sheet.

Where the composite sheet material is intended for use in apparel, the staple fiber components of the first and second nonwoven layers are preferably selected so as to have some degree of hydrophobicity. Fibers having hydrophilic finishes applied thereto are generally less preferred. Hydrophilic fibers can contribute to soaking of the nonwoven layer by fluids, such as blood, by capillary action when the fluid contacts the edge of the fabric, such as may occur with the sleeve of a medical garment. Very fine fibers (low dtex per filament) have also been found to contribute to this problem. Preferably the staple fibers are larger than about 1 denier per filament (1.1 dtex), and more preferably larger than 1.5 denier per filament (1.65 dtex), where the composite sheet material is to be used in apparel.

The nonwoven fibrous web 22 should exhibit strength, permeability, and softness properties that are desired for the end use for which the composite sheet is to be applied. For example, where the composite sheet 10 is to be used in an absorbent article, the fibrous composite web 22 should preferably have a tensile strength of at least 1 N/cm and an elongation of at least 30% in both the machine and cross directions. The machine direction is the long direction within the plane of the sheet, i.e., the direction in which the sheet is produced. The cross direction is the direction within the plane of the sheet that is perpendicular to the machine direction. More preferably, the fibrous webs should have a tensile strength of at least 1.5 N/cm and an elongation of at least 50% in both the machine and cross directions. Preferably, the fibrous web is a porous structure that enhances both moisture permeability through the composite sheet and physical bonding between the film and web layers of the composite sheet.

Powder adhesives suitable for preparing the powder bonded-nonwoven layer are preferably polyester copolymer powders such as those available from EMS-American Grilon, Inc. The bonding powder should have a lower melting point than the fibers in the web. In general, the bonding powder will be a thermoplastic material and it should be capable of forming a good adhesive bond with the fibers being used. In the case of polyester fibers, it is particularly preferred to use a polyester or copolyester bonding powder. Typical copolyester adhesives have melting points of from 100 to 130° C. and are available as coarse powders (200–420 microns or 70–40 U.S. standard mesh), medium powders (80–200 microns or 200–70 U.S. standard mesh) and fine powders (80 microns or less, or finer than 200 U.S. standard mesh), the medium powders being preferred when mechanical applicators are used to apply the adhesive powder to the web.

The powder-bonded nonwoven web 22 used in the composite sheet of the invention is prepared using methods known in the art, such as the process described in Zimmerman et al. U.S. Pat. 4,845,583. The second nonwoven layer 14, comprising a blend of compatible and incompatible fibers, is laid on top of the first nonwoven layer 16 and the combined layers are optionally passed through a web spreading section prior to applying the powdered adhesive material. The adhesive powder is applied to the nonwoven web using a powder-depositing device. The powder drops onto the web and is distributed through the web by gravity. Excess powder falls through the web and is collected for recycling. The weight of powder deposited in the nonwoven web is preferably from about 8 to about 30 percent of the total combined weight of the nonwoven layers of the web, and more preferably between about 15 to 25 percent of the combined weight of the nonwoven layers of the web. Bonding of the nonwoven layers can be achieved by passing the web through an oven, such as an infrared oven in which the adhesive powder fuses and bonds the fibers of the web at fiber crossover points where the fibers and the bonding material come into contact. Upon leaving the oven, the web is subjected to light pressure by means of a nip roll.

The mixing of the thermoplastic polymer or blends of polymers that comprise the film layer 12 of the composite sheet of the invention can be conducted according to methods and techniques known in the art, e.g., by physical tumble blending followed by extrusion and mixing in a single screw extruder equipped with a mixing head such as those available from Davis-Standard Corp. (Pawcatuck, R.I., USA) or a twin screw compounding extruder such as those available from Warner-Pfliederer (Ramsey, N.J., USA) and Bersdorf Corporation (Charlotte, N.C., USA). Alternatively, loss in weight or volumetric feeders such as those available from K-Tron America (Pitman, N.J., USA) may be used to control the composition being fed to the extruders.

The film layer 12 is preferably applied to the second nonwoven layer of the powder-bonded fibrous web by extrusion-coating. In the extrusion coating process, a uniform molten extrudate is coated on the powder-bonded fibrous web. The molten polymer and the web are brought into more intimate contact as the molten polymer cools and bonds with the web. Such contact and bonding can be enhanced by passing the layers through a nip formed between two rolls. Alternatively, the molten polymer can be pulled into contact with the fibrous web by passing the coated web over a suction inlet such that a vacuum pulls the molten polymer into contact with the web as the polymer cools and bonds with the web. During the extrusion coating process, some or all of the powder adhesive is remelted and provides improved bonding between the thin film layer and the fibrous web. The bonding between the adhesive present in the web and the polymer in the film makes it easier to produce a very thin moisture vapor permeable film that is substantially free of pinholes or other defects, yet still has a relatively high rate of moisture vapor transmission. As used herein, "pinholes" means small holes inadvertently formed in a film either during manufacture or processing of the film.

Figure 2:
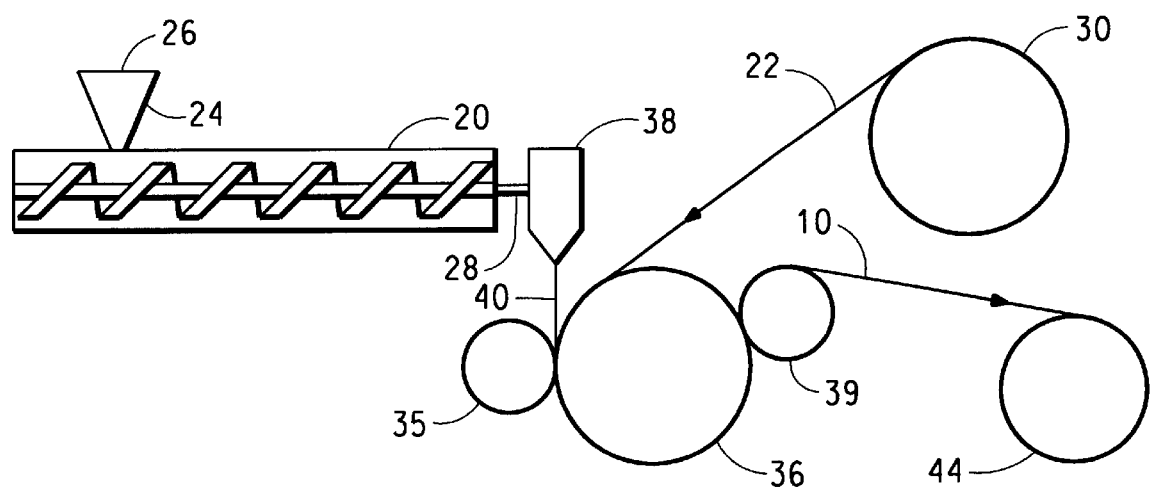
FIG. 2 is a schematic representation of a process by which the composite sheet structure of the invention can be made.

One preferred means for applying the film layer to the powder bonded nonwoven web is illustrated in FIG. 2. Thermoplastic polymer is fed in pellet form, along with any additives, into an inlet 26 of an extruder hopper 24, preferably under a nitrogen purge. The polymer is melted and mixed in a screw extruder 20 at a screw speed in the range of 100 to 200 rpm, depending on the dimensions of the extruder and the properties of the polymer. The melted mixture is discharged from the extruder under pressure through a heated line 28 to a flat film die 38. The polymer is discharged from the flat film die 38 at a temperature above the melting temperature of the polymer, and preferably at a temperature in the range of 180° C. to 240° C. The polymer melt 40 discharging from the flat film die 38 coats the powder bonded fibrous nonwoven web 22 provided from supply roll 30.

Preferably, the fibrous web 22 passes under the die at a speed that is coordinated with the speed of the extruder so as to obtain a very thin film that preferably has a thickness of less than 25 microns. The coated web enters a nip formed between nip roll 35 and roll 36, which rolls are maintained at a temperature selected to obtain a composite sheet with a desired peel strength and moisture vapor permeability. The temperature of rolls 35 and 36 is preferably within the range of 10° C. to 120° C. Higher roll temperatures yield a composite sheet having a higher peel strength, while lower roll temperatures yield composite sheets with a higher moisture vapor permeability. Preferably, nip roll 35 is a smooth rubber roll with a low-stick surface coating while roll 36 is a metal roll. Nip roll 35 can also have a matte or textured finish to prevent sticking of the film layer. A textured embossing roll may be used in place of the metal roll for the roll 36 if a composite sheet with a more textured film layer is desired. Passing the coated web through the nip formed between cooled rolls 35 and 36 quenches the polymer melt while at the same time pressing the polymer melt 40 into contact with the fibers and adhesive of the fibrous web 22. The nip pressure applied should be sufficient to get the desired bonding between the film and the nonwoven but not so great as to create pinholes in the film layer. The coated composite 10 is transfered from the roll 36 to another smaller roll 39 before being wound up on a collection roll 44.

The second nonwoven layer 14 of the fibrous web 22 is preferably made with a smooth exposed surface from which substantially few fibers extend out from the plane of the fibrous web. This smooth surface of the web is important when laminating a very thin film (<25 microns) to the fibrous web. If the film is laminated to the surface of a fibrous web that is not relatively smooth, fibers that protrude out from the plane of the web will likely protrude through the film, which may create pinholes and thereby allow liquid seepage through the composite sheet.

The film layer 12 of the composite sheet can be comprised of multiple layers. Such a film may be co-extruded with layers comprised of one or more of the above described thermoplastic film materials. Examples of such multiple layer moisture vapor permeable films, which typically comprise a comparatively more hydrophobic elastomer layer and a comparatively more hydrophilic elastomer layer, are disclosed in Ostapchenko, U.S. Pat. No. 4,725,481, which is hereby incorporated by reference. In a preferred embodiment, the multiple layer film (in a bi-layer execution) is extruded onto the second nonwoven layer 14 of the composite fibrous web 22 with the comparatively more hydrophobic elastomer layer facing outwardly from the web and the comparatively more hydrophilic elastomer layer bonded to the second nonwoven layer of the fibrous web. Typically, for a given thickness, the hydrophobic elastomer layer exhibits a lower moisture vapor transmission rate than the hydrophilic elastomer layer due to its comparatively lower moisture content under in-use conditions. However, when employed in a comparatively thin layer, the effect of the hydrophobic lower moisture content film layer does not significantly diminish the moisture vapor transmission rate of the overall composite sheet. Preferably, the comparatively more hydrophobic elastomer comprises between 20 and 30 percent of the total thickness of the composite film layer. In medical garment end uses, the garment can be manufactured with the film layer facing outwardly, away from the person wearing the garment. The outer, comparatively more hydrophobic layer swells less when contacted with aqueous materials resulting in less puckering of the fabric when contacted with aqueous materials. Because the majority of the film layer is comprised of the comparatively more hydrophilic layer, the garment also maintains an excellent moisture vapor transmission rate to ensure the comfort of the wearer.

Figure 3:
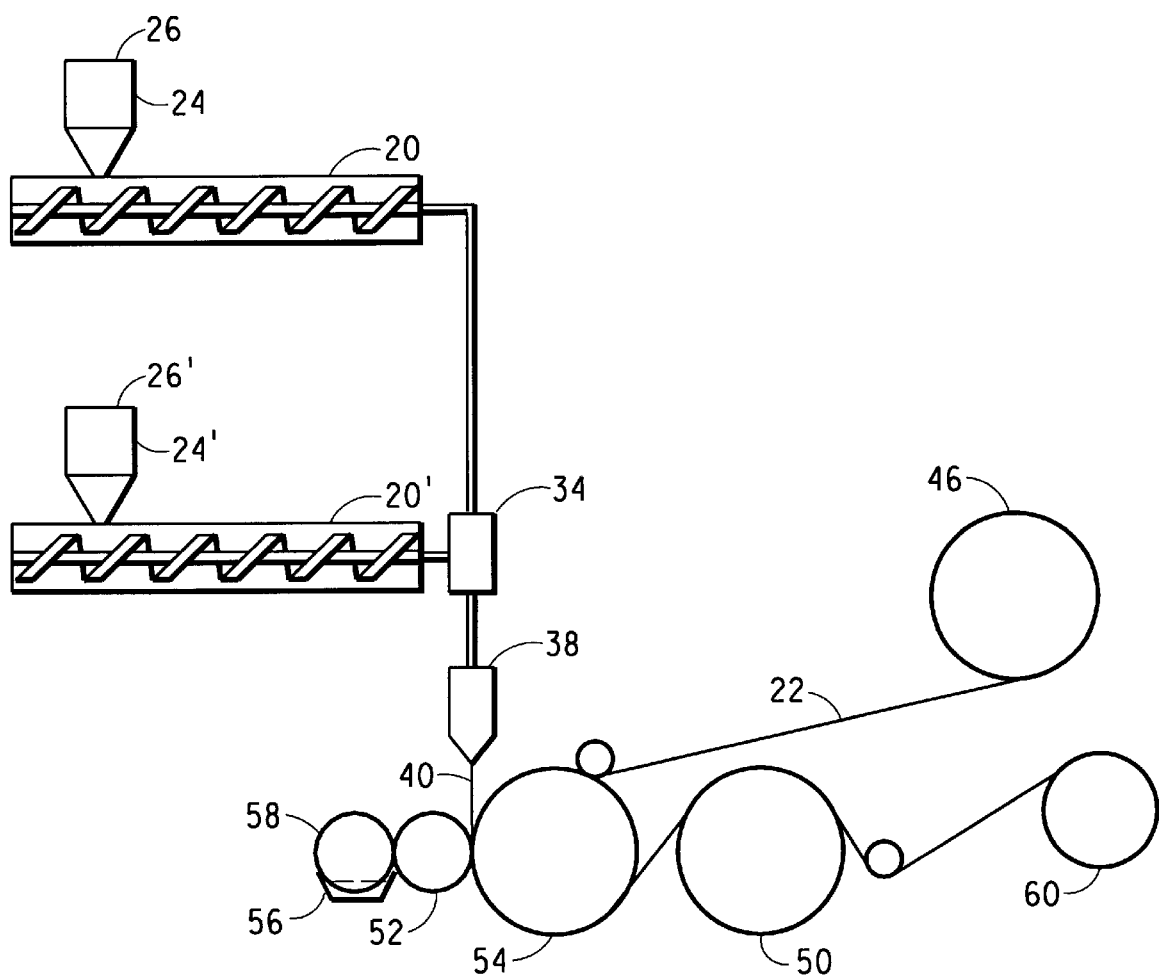
FIG. 3 is a schematic representation of an alternative process by which the composite sheet structure of the invention can be made.

FIG. 3 illustrates a process for extrusion coating of a two-layer film on a powder-bonded nonwoven web. A first thermoplastic polymer is fed in pellet form, along with any additives, into the inlet 26 of extruder hopper 24, while a second thermoplastic polymer is fed in pellet form, along with any additives, into the inlet 26' of extruder hopper 24'. The polymer is melted and mixed in the screw extruders 20 and 20' at screw speeds that depend on the dimensions of the extruders and the properties of the polymer. The melted mixture is discharged from the extruder under pressure through heated lines to a melt combining block 34, where a multiple layer melt is formed that is extruded as a multiple layer film through flat film die 38. The polymer is discharged from the flat film die 38 at a temperature above the melting point of the polymer mixture, and preferably at a temperature in the range of 180° C. to 240° C. The polymer melt 40 discharging from the flat film die 38 coats the powder-bonded fibrous web 22 provided from a supply roll 46. Preferably, the powder-bonded fibrous web 22 passes under the die 38 at a speed that is coordinated with the speed of the extruder so as to obtain a very thin film thickness of less than 25 microns on the fibrous web. The coated web enters a nip formed between nip roll 52 and roll 54, which rolls are maintained at a temperature selected to obtain a composite sheet with a desired peel strength and moisture vapor permeability. A water dip pan 56 with associated roll 58 can be used to increase the quench rate and to prevent sticking. Alternatively, a water mist applied to the film layer or a water bath associated with roll 52 may be used. An optional cooled quench roll 50 can be used to provide additional cooling prior to winding the composite sheet product on collection roll 60.

When used for garment end uses such as medical gowns, the extrusion-coated powder-bonded nonwoven composite preferably has a basis weight of about 1.2 to 3 oz/yd$^2$ (41 to 102 g/m$^2$) and a grab tensile strength of at least 11 lb/inch (1925 N/m), and more preferably at least 15 lb/inch (2625 N/m) in both the machine and cross directions. When used for diapers, the powder-bonded multi-layer nonwoven composite preferably has a basis weight of about 0.5 to 0.7 oz/yd$^2$ (17 to 24 g/m$^2$) and a tensile strength of at least 2.2 lb/inch (386 N/m) in the machine direction and at least 0.8 lb/inch (140 N/m) in the cross direction.

The powder-bonded composite sheet material of the current invention has a significantly higher hydrostatic head than similar fabrics prepared using a thermally bonded nonwoven layer. The moisture vapor transmission rate of the fibrous web may be reduced slightly when a powder-bonded nonwoven is used. However, the use of a powder-bonded web results in improved bonding between the nonwoven web and the film layer compared to fabrics where the nonwoven layer comprises a thermally-bonded nonwoven, such that thinner film layers without pinholes are possible. Use of thinner film layers results in an increase in the moisture vapor transmission rate and a small reduction in hydrostatic head, with the final powder-bonded composite having a higher moisture vapor transmission rate and hydrostatic head than thermally-bonded nonwovens coated with films of greater thickness (See Example 1 and Comparative Example A below).

In an alternative embodiment of the invention, the composite sheet structure may be comprised of a moisture vapor permeable film layer with two fibrous webs like the composite web 22 described above, adhered on opposite sides of the film layer. In this alternative embodiment of the invention, the second nonwoven layer of each of the fibrous webs, which layer is comprised of a blend of fibers that are compatible and incompatible with the film layer, would be bonded directly to opposite sides of the film layer in a manner similar to that described above.

Test Methods

In the description above and in the non-limiting examples that follow, the following test methods were employed to determine various reported characteristics and properties. ASTM refers to the American Society for Testing and Materials, TAPPI refers to the Technical Association of Pulp and Paper Industry, and ISO refers to the International Organization for Standardization.

Basis weight was determined by ASTM D-3776, which is hereby incorporated by reference, and is reported in g/m$^2$.

Tensile strength was determined by ASTM D 5035-95, which is hereby incorporated by reference, with the following modifications. In the test a 2.54 cm by 20.32 cm (1 inch by 8 inch) sample was clamped at opposite ends of the sample. The clamps were attached 12.7 cm (5 in) from each other on the sample. The sample was pulled steadily at a speed of 5.08 cm/min (2 in/min) until the sample broke. The force at break was recorded in pounds/inch and converted to Newtons/cm as the breaking tensile strength.

Film thickness was determined by ASTM Method D177-64, which is hereby incorporated by reference, and is reported in microns.

Grab Tensile Strength was determined by ASTM D 5034-95, which is hereby incorporated by reference, was measured in pounds/inch and is reported in Newtons/cm.

Elongation to Break of a sheet is a measure of the amount a sheet stretches prior to failure (breaking)in a strip tensile test. A 1.0 inch (2.54 cm) wide sample is mounted in the clamps—set 5.0 inches (12.7 cm) apart—of a constant rate of extension tensile testing machine such as an Instron table model tester. A continuously increasing load is applied to the sample at a crosshead speed of 2.0 in/min (5.08 cm/min) until failure. The measurement is given in percentage of stretch prior to failure. The test generally follows ASTM D 5035-95.

Peel strength is measured according to a test that generally follows the method of ASTM D2724-87, which is hereby incorporated by reference. The test was performed used a constant rate of extension tensile testing machine such as an Instron table model tester. A 2.54 cm (1.0 in) by 20.32 cm (8.0 in) sample is delaminated approximately 3.18 cm (1.25 in) by initiating a separation between the fibrous web and the moisture vapor permeable film. The separated sample faces are mounted in the clamps of the tester which are set 5.08 cm (2.0 in) apart. The tester is started and run at a cross-head speed of 50.8 cm/min (20.0 in/min). The computer starts picking up readings after the slack is removed, nominally a 5 gram pre-load. The sample is delaminated for about 12.7 cm (5 in) during which sufficient readings are taken to provide a representative average of the data. The peak load and average peel strength is given in N/cm. For samples that are peeled the entire 5 inches the average peel strength is considered to be the peel strength. For samples that do not peel the entire 5 inches due to either full bond conditions or failures in the substrates, the peak load is considered to be the peel strength.

Hydrostatic head was measured according to AATCC Test Method 127, which measures the resistance to water penetration on a 7 in×7 in (18 cm×18 cm) test sample. Water pressure is applied to the fabric side of the test specimen until the sample is penetrated by water at three places. The hydrostatic pressure is measured in inches and converted to SI units and is reported in cm of water. The equipment used to measure hydrostatic head is made by Aspull Engineering Ltd, England.

Water Absorption is measured according to ASTM D570, which is hereby incorporated by reference.

Moisture Vapor Transmission Rate (MVTR) is reported in $g/m^2/24$ hrs and was measured using MVTR data acquired by ASTM E398-83 that was collected using a LYSSY MVTR tester model L80-4000J. LYSSY is based in Zurich, Switzerland. MVTR test results are highly dependent on the test method used and material type. Important variables between test methods include pressure gradient, volume of air space between liquid and sheet sample, temperature, air flow speed over the sample and test procedure. ASTM E398-83 (the "LYSSY" method) is based on a pressure gradient of 85% relative humidity ("wet space") vs. 15% relative humidity ("dry space"). The LYSSY method measures the moisture diffusion rate for just a few minutes and under a constant humidity delta, which measured value is then extrapolated over a 24 hour period.

Viral Barrier properties were measured according to ASTM F1671, which is hereby incorporated by reference. ASTM F1671 is a standard test method for measuring the resistance of materials used in protective clothing to penetration by blood-borne pathogens. According to this method, three samples of a sheet material being tested are challenged with $10^8$ Phi-X174 bacteriophage, similar in size to the Hepatitis C virus (0.028 microns) and with a surface tension adjusted to 0.042 N/m, at a pressure differential of 2 psi (13.8 kPa) for a 24 hour period. Penetration of the sample by viable viruses is determined using an assay procedure. The test results are reported in units of Plaque Forming Units per milliliter PFU/ml. A sample fails if any viral penetration is detected through any of the samples. A sample passes if zero PFU/ml were detected after the 24 hour test period.

A positive and negative control is run with each sample set. The positive control was a microporous membrane with a pore size of 0.04 microns which passed 600 PFU/ml. The negative control was a sheet of Mylar® film, which passed 0 PFU/ml.

Liquid Seepage is detected using a solution of 70 parts isopropyl alcohol, 30 parts water and 1 part red dye food color. According to this test, a sheet of a white absorbent blotting material measuring about 89 cm by 61 cm (35 in by 24 in) is placed on a flat surface and covered with a test sample of the same dimensions with the substrate side of the sample facing up. A 250 ml portion of the solution is poured on top of the test sample and covered with a template measuring about 46¾ cm by 46¾ cm (18 in by 18 in). A 4.5 kg (10 lb) weight is placed on top of the template for 10 minutes after which the weight, template and test sample are removed from the white blotting paper. The paper is then inspected for ink spots to determine whether seepage occurred.

Bacterial barrier is measured according to ISO 11607 which states under section 4.2.3.2 that a material that is impermeable to air for one hour (according to an air porosity test) satisfies the standard's microbial barrier requirements. With regard to porous materials, section 4.2.3.3 of ISO 11607 states that there is no universally applicable method of demonstrating microbial barrier properties in porous materials, but notes that the microbial barrier properties of porous materials is typically conducted by challenging samples with an aerosol of bacterial spores or particulates under a set of test conditions which specify the flowrate through the material, microbial challenge to the sample, and duration of the test. One such recognized test is ASTM F 1608-95.

EXAMPLES

The following non-limiting examples are intended to illustrate the product and process of the invention and not to limit the invention in any manner.

Film Components

The individual components in the film compositions described in the examples below were as follows:

Hytrel® G4778 is a copolyether ester thermoplastic elastomer sold by DuPont, and having a melting point of 208° C., a vicat softening temperature of 175° C., a shore hardness of 47D, and a water absorption of 2.3%.

Hytrel® HTR 8206 is a copolyether ester thermoplastic elastomer sold by DuPont, and having a melting point of 200° C., a vicat softening temperature of 151° C., a shore hardness of 45D, and a water absorption of 30%.

Hytrel® HTR 8171 is a copolyether ester thermoplastic elastomer sold by DuPont, and having a melting point of 150° C., a vicat softening temperature of 76° C., a shore hardness of 32D, and a water absorption of 54%.

$TiO_2$ Concentrate was a concentrate of 50% by weight particulate titanium dioxide pigment in high density polyethylene. The $TiO_2$ is added to make the film layer opaque.

A Hytrel® 8206/8171 blend was prepared by dry blending the copolyether ester thermoplastic elastomers and the titanium dioxide concentrate.

Examples 1–2

A bi-layer fibrous nonwoven web was produced from two carded webs by powder bonding. The first layer was a carded web of a blend of 50 weight percent poly(ethylene terephthalate) (PET) staple fiber (Dacron® Type 54W polyester fiber, 1.5 inch (3.8 cm) cut length, 1.5 denier (1.65 dtex), manufactured by DuPont) and 50 weight percent polypropylene staple fibers (1.5 inch (3.8 cm)) cut length, 2.8 denier per filament (3.08 dtex), T-198 polypropylene fiber manufactured by FiberVision Company). The second layer was a carded web of 100% poly(ethylene terephthalate) staple fiber (Dacron® 90S PET, 1.5 inch cut length, 2.25 denier, manufactured by DuPont). The first layer was placed on top of the second layer, the combined layers passed through a web-spreading section for a final basis weight for each layer of 0.28 oz/yd² (9.5 g/m²), and a copolyester powder adhesive (Griltex ® DS1371, obtained from EMS-American Grilon, Inc.) having a melting point of between 99° C. and 105° C. was applied to the combined nonwoven layers at 0.14 oz/yd² (4.7 g/m²). The web was then passed through an infrared oven and heated to melt the powder adhesive, and then through a nip which applied a light pressure. The basis weight of the final powder-bonded nonwoven substrate was 0.7 oz/yd² (23.7 g/m²).

The powder-bonded composite nonwoven layer was extrusion coated with a two-layer Hytrel® copolyether ester film as shown in FIG. 3. The first film layer, extruded adjacent the first (fiber blend) nonwoven layer of the web, was a blend of 46 wt % Hytrel® 8206, 48 wt % Hytrel® 8171, and 6 wt % of the $TiO_2$ concentrate, and comprised approximately 80% of the total thickness of the film layer, based on scanning electron micrographs. The second (top) film layer was Hytrel® G4778 and comprised approximately 20% of the total thickness of the film layer. The components of the first film layer were mixed and fed in pellet form into a 4 inch (10.2 cm) diameter screw extruder that was connected to the melt combining block. The Hytrel® G4778 for the second layer was fed in pellet form into a different 3 inch (7.6 cm) diameter screw extruder that was connected to the same melt combining block. The components for both film layers were each melted at a temperature of 440° F. (226° C.) and extruded to the melt combining block. The two layer melt was then fed to a 30 mil (762μ) by 102 cm die opening in a heated die block maintained at 232° C. A bi-layer film was extruded from the die opening and was coated on the powder-bonded composite nonwoven fibrous substrate. The powder-bonded nonwoven substrate was spaced about 12 inches (30.5 cm) below the opening of the die. The film was extruded at a constant rate in order to keep the 2-layer film thickness constant at 20 microns. The film was joined to the fibrous powder-bonded nonwoven substrate by passing the coated web through a pair of nip rolls. Nip roll 52, facing the polymer melt, was a silicone rubber roll having a matte finish. Quench roll 50 was maintained at 65° F. (18° C.).

The procedure of Example 1 was followed for Example 2 except that the line speed during film extrusion was adjusted to reduce the thickness of the 2-layer Hytrel® film from 20 microns to 15 microns.

The properties of the composite fabrics are reported below in Table 1. The results are discussed in Comparative Example A.

Comparative Example A

A bi-layer nonwoven fabric was produced by thermal-calender bonding of two carded staple nonwoven layers. The first nonwoven layer was a 0.35 oz/yd² (11.9 g/m²) carded web of a blend of 50 weight percent poly(ethylene terephthalate) staple fiber (Dacron® Type 54W polyester fiber, 1.5 inch (3.8 cm) cut length, 1.5 denier per filament (1.65 dtex), manufactured by DuPont) and 50 weight percent polypropylene staple fibers (1.5 inch cut length, 2.8 denier per filament (3.08 dtex), T-198 polypropylene fiber manufactured by FiberVision Company). The second nonwoven layer was a 0.35 oz/yd² (11.9 g/m²) carded web of 100% T-198 polypropylene staple fiber. The first carded web was placed on top of the second carded web and point-bonded with a thermal-calender bonder using a very light nip pressure to optimize drapeability. The thermally-bonded composite nonwoven layer was extrusion coated with a bi-layer copolyether ester film using the process conditions and film layers described in Example 1. The properties of the composite fabric are reported below in Table 1.

The results shown in Table 1 demonstrate that for a film thickness of 20 microns, the fabric of the invention prepared using the powder-bonded nonwoven substrate (Example 1) has twice the peel strength in both the machine direction (MD) and cross direction (CD) compared to the fabric prepared using the thermally-bonded nonwoven substrate. In addition, the 20 micron thick fabric of the invention (Example 1) has greater than four times the hydrostatic head compared to Comparative Example A, with only a 7% reduction in MVTR. Example 2 demonstrates that by reducing the thickness of the Hytrel® polymer film layer by 25% to 15 microns, that a peel strength is achieved that is equivalent to Comparative Example A having a 20 micron thick film layer, while maintaining a hydrostatic head that is greater than 3 times that of Comparative Example A, and a MVTR that is 11% higher. A liquid moisture seepage test was performed by applying the food coloring/alcohol solution to the film side of the composite fabrics. Significantly fewer pinhole defects were detected with the powder-bonded nonwoven composite compared to the thermally-bonded nonwoven composite.

Example 3

A bi-layer fibrous nonwoven layer was produced from two carded webs by powder bonding. The first layer was a 0.40 oz/yd² (13.6 g/m²) carded web (basis weight measured after web spreading during powder bonding process as described in Examples 1 and 2) of a blend of 50 weight percent poly(ethylene terephthalate) staple fiber (Dacron® Type 90S polyester fiber, 1.5 inch cut length (3.8 cm), 2.25 denier per filament (2.5 dtex), manufactured by DuPont) and 50 weight percent polyamide staple fibers (Type 200 nylon 6,6 staple manufactured by DuPont, 1.5 inch (3.8 cm) cut length, 1.8 denier (2.0 dtex)). The second layer was a 0.80 oz/yd² (27.1 g/m²) carded web (basis weight measured after web spreading during powder bonding process) of 100% poly(ethylene terephthalate) staple fiber (Dacron® 90S PET, 1.5 inch (3.8 cm) cut length, 2.25 denier per filament (2.5 dtex), manufactured by DuPont) The first layer was placed on top of the second layer and a copolyester powder adhesive (Griltex® DS1371, obtained from EMS-American Grilon, Inc.), having a melting point of between 99° C. and 105° C., was applied to the nonwoven at 0.3 oz/yd² (10.2 g/m²). The nonwoven layers were powder bonded using the method described in Example 1. The basis weight of the final powder-bonded nonwoven substrate was 1.5 oz/yd² (50.9 g/m²).

The powder-bonded composite nonwoven substrate was extrusion coated with a bi-layer copolyether ester film using the process conditions and film layers described in Example 1. The properties of the composite fabric are reported below in Table 1.

Example 4

A bi-layer fibrous nonwoven layer was produced from two carded webs by powder bonding. The first layer was a 0.28 oz/yd$^2$ (9.5 g/m$^2$) (basis weight measured after web spreading during powder bonding process as described in Examples 1 and 2) carded web of a blend of 50 weight percent poly(ethylene terephthalate) staple fiber (Dacron® Type 54W polyester fiber, 1.5 inch (3.8 cm) cut length, 1.5 denier per filament (1.65 dtex), manufactured by DuPont) and 50 weight percent polyamide staple fibers (Type 200 nylon 6,6 staple manufactured by DuPont, 1.5 inch (3.8 cm) cut length, 1.8 denier (2.0 dtex)). The second layer was a 0.96 oz/yd$^2$ (32.6 g/m$^2$) (basis weight measured after web spreading during powder bonding process) carded web of 100% poly(ethylene terephthalate) staple fiber (Dacron® 90S PET, 1.5 inch (3.8 cm) cut length, 2.25 denier per filament (2.5 dtex), manufactured by DuPont). The first layer was placed on top of the second layer and a copolyester powder adhesive (Griltex® DD1371, obtained from EMS-American Grilon, Inc.), having a melting point between 99° C. and 105° C., was applied to the nonwoven at 0.3 oz/yd$^2$ (10.2 g/m$^2$). The nonwoven layers were powder bonded using the method described in Example 1. The basis weight of the final powder-bonded nonwoven substrate was 1.54 oz/yd$^2$ (52.2 g/m$^2$).

The powder-bonded composite nonwoven substrate was extrusion coated with a bi-layer copolyether ester film using the process conditions and film layers described in Example 1 except that the line speed was adjusted to obtain a film thickness of 23 microns. The properties of the composite fabric are reported below in Table 1.

Examples 3 and 4 show a composite sheet in which the nonwoven web includes nylon staple fiber. As can be seen in Table 1, the moisture vapor transmission rate of the composite sheet of Example 3 was greater than that of that of Example 4 where the film was slightly thicker. The sheets of Examples 3 and 4 were tested for viral barrier and were both found to provide a barrier to viruses.

Examples 5

A bi-layer fibrous nonwoven layer was produced from two carded webs by powder bonding. The first layer was a 0.24 oz/yd$^2$ (8.3 g/m$^2$) (basis weight measured after web spreading during powder bonding process as described in Examples 1 and 2) carded web of a blend of 70 weight percent poly(ethylene terephthalate) staple fiber (Dacron® 90S PET, 1.5 inch (3.8 cm) cut length, 2.25 denier per filament (2.5 dtex), manufactured by DuPont) and 30 weight percent polyamide staple fibers (Type 200 nylon 6,6 staple manufactured by DuPont, 1.5 inch (3.8 cm) cut length, 1.8 denier (2.0 dtex)). The second layer was a 0.96 oz/yd$^2$ (32.6 g/m$^2$) (basis weight measured after web spreading during powder bonding process) carded web of 100% poly(ethylene terephthalate) staple fiber (Dacron® 90S PET, 1.5 inch (3.8 cm) cut length, 2.25 denier per filament (2.5 dtex), manufactured by DuPont). The first layer was placed on top of the second layer and a copolyester powder adhesive (Griltex® DD1371, obtained from EMS-American Grilon, Inc.), having a melting point between 99° C. and 105° C., was applied to the nonwoven at 0.3 oz/yd$^2$ (10.2 g/m$^2$). The nonwoven layers were powder bonded using the method described in Example 1. The basis weight of the final powder-bonded nonwoven substrate was 1.5 oz/yd$^2$ (51.7 g/m$^2$).

In Example 5, the first side of powder-bonded composite nonwoven substrate (the 70/30 polyester/nylon blend side) was extrusion coated with a bi-layer copolyether ester film as shown in FIG. 3. The first film layer, extruded adjacent the first (fiber blend) nonwoven layer of the web, was a blend of 94 wt % Hytrel® 8206 and 6 wt % of the TiO$_2$ concentrate, and comprised approximately 80% of the total thickness of the film layer, based on scanning electron micrographs. The second (top) film layer was Hytrel® G4778 and comprised approximately 20% of the total thickness of the film layer. The components of the first film layer were mixed and fed in pellet form into a 4 inch (10.2 cm) diameter screw extruder that was connected to the melt combining block. The Hytrel® G4778 for the second layer was fed in pellet form into a different 3 inch (7.6 cm) diameter screw extruder that was connected to the same melt combining block. The components for both film layers were each melted at a temperature of 440° F. (226° C.) and extruded to the melt combining block. The two layer melt was then fed to a 30 mil (762µ) by 102 cm die opening in a heated die block maintained at 232° C. A bi-layer film was extruded from the die opening and was coated on the powder-bonded composite nonwoven fibrous substrate. The powder-bonded nonwoven substrate was spaced about 12 inches (30.5 cm) below the opening of the die. The film was extruded at a constant rate in order to keep the 2-layer film thickness constant at 25 microns. The film was joined to the fibrous powder-bonded nonwoven substrate by passing the coated web through a pair of nip rolls. Nip roll 52, facing the polymer melt, was a silicone rubber roll having a matte finish. Quench roll 50 was maintained at 65° F. (18° C.). The properties of the composite fabric are reported below in Table 1.

Comparitive Examples B

In Comparitive Example B, the second side of another piece of the powder-bonded composite nonwoven substrate of Example 5 (the 100% polyester side) was extrusion coated with the bi-layer copolyether ester film described in Example 5 under the same process conditions used in Example 5. The properties of the composite fabric are reported below in Table 1.

Example 5 and Comparative Example B demonstrate the effect of blending a fiber into the nonwoven web that is not readily compatible with the polymer of the moisture vapor permeable film layer. The laminate made with the film extruded onto the polyester/nylon fiber blend side of the powder-bonded web (Example 5) had a lower bond strength but a higher moisture vapor transmission rate than the laminate made with the film extruded onto the 100% polyester fiber side of the powder-bonded web (Comparative Example B). In addition, it was observed that the laminate of Example 5 was much softer, more drapable and less noisy than the laminate of Comparative Example B.

It will be apparent to those skilled in the art that modifications and variations can be made in breathable composite sheet material of this invention. The invention in its broader aspects is, therefore, not limited to the specific details or the illustrative examples described above. Thus, it is intended that all matter contained in the foregoing description, drawings and examples shall be interpreted as illustrative and not in a limiting sense.

TABLE 1

| Example | Film Thickness (μ) | Tensile Strength (N/cm) MD | Tensile Strength (N/cm) CD | Elongation (%) MD | Elongation (%) CD | Basis Wt (g/m²) | MVTR (g/m²/day) | Hydrostatic Head (cm) | Viral Barrier | Peel Strength (N/cm) MD | Peel Strength (N/cm) CD |
|---|---|---|---|---|---|---|---|---|---|---|---|
| 1 | 20 | 7.9 | 1.8 | 23 | 85 | 48.2 | 1320 | 356 | — | 0.77 | 0.70 |
| 2 | 15 | 8.6 | 1.6 | 20 | 60 | 44.8 | 1580 | 277 | — | 0.38 | 0.38 |
| A | 20 | 8.1 | 2.3 | 46 | 97 | 49.5 | 1425 | 76 | — | 0.38 | 0.33 |
| 3 | 20 | 51* | 19* | — | — | — | 1490 | >274 | Pass | 0.46 | 0.42 |
| 4 | 23 | 61* | 26* | — | — | — | 1180 | >399 | Pass | 0.88 | 0.77 |
| 5 | 25 | 54* | 28* | — | — | — | 1040 | >399 | — | 0.63 | — |
| B | 25 | 65* | 33* | — | — | — | 941 | >399 | — | 1.00 | — |

*Grab tensile

What is claimed is:

1. A moisture vapor permeable, substantially liquid impermeable composite sheet material comprising:
a first fibrous nonwoven web having a first side and an opposite second side,
a second fibrous nonwoven web having a first side and an opposite second side, the first side of said second fibrous nonwoven web abutting the second side of said first fibrous nonwoven web,
said first and second fibrous nonwoven webs each being powder-bonded webs wherein the fibers of said first and second fibrous webs are bonded to the other fibers of such respective webs by a synthetic adhesive permeating said first and second nonwoven fibrous webs, and wherein the first and second fibrous nonwoven webs are bonded to each other by said adhesive,
a moisture vapor permeable thermoplastic film bonded to the second side of said second fibrous nonwoven web; wherein
at least 90 weight percent of the fibers in said first fibrous nonwoven web are compatible with said adhesive,
between 25 and 75 weight percent of the fibers in said second fibrous nonwoven web are compatible with said adhesive and said thermoplastic film,
between 75 and 25 weight percent of the fibers in said second fibrous nonwoven web are incompatible with said adhesive and said thermoplastic film, and
at least 50 weight percent of the polymer in said thermoplastic film is compatible with said adhesive.

2. The composite sheet material of claim 1 wherein the weight of the fibers in said second nonwoven fibrous web is between ¼ and 4 times the weight of the fibers in said first nonwoven fibrous web.

3. The composite sheet material of claim 1 wherein said film has an average thickness of less than 25 microns.

4. The composite sheet material of claim 3 wherein said film has an average thickness of less than 20 microns.

5. The composite sheet material of claim 3 wherein said composite sheet material exhibits a peel strength of at least 0.1 N/cm, a hydrostatic head of at least 60 cm, and a moisture vapor transmission rate, according to the LYSSY method, of at least 1000 g/m²/24 hr.

6. The composite sheet material of claim 3 wherein the composite sheet material is substantially free of pinholes, and substantially no liquid passes through the sheet when tested according to the liquid seepage test.

7. The composite sheet material of claim 6 wherein said composite sheet material prevents passage of microbes when tested according to the ISO 11607 standard for sterile packaging materials.

8. The composite sheet material of claim 7 wherein said composite sheet material, when tested according to ASTM F1671, prevents the passage of microbes and viruses with a diameter greater than 0.025 microns.

9. The composite sheet material of claim 3 wherein said moisture vapor permeable film has first and second layers, each of said layers being comprised of a different moisture vapor permeable thermoplastic polymer composition.

10. The composite sheet material of claim 9 wherein
said first layer of said moisture vapor permeable film comprises at least 60% of the total weight of the film and is comprises of a substantially hydrophilic layer,
said second layer of said moisture vapor permeable film comprises a substantially hydrophobic layer, and
said first layer of said moisture vapor permeable film is bonded to the second side of said second fibrous nonwoven web.

11. The composite sheet material of claim 1 wherein
said adhesive is a polyester polymer or polyester copolymer adhesive,
said moisture vapor permeable film is comprised of at least about 75% by weight of polymer selected from the group of block copolyether esters, block copolyether amides, copolyether imide esters, polyurethanes, polyvinyl alcohol, and combinations thereof,
at least 90 weight percent of the fibers in said first fibrous nonwoven web are made of polymer selected from the group of polyester polymers and copolymers,
between 25 and 75 weight percent of the fibers in said second fibrous nonwoven web are made of polymer selected from the group of polyester polymers and copolymers, and
between 75 and 25 weight percent of the fibers in said second fibrous nonwoven web are made of polymer selected from the group of polyamides, polyolefins, acrylics, and cotton.

12. The composite sheet material of claim 11 wherein said polyester polymers and polyester copolymers in said fibers are selected from the group of poly(ethylene terephthalate), poly(1,3-propylene terephthalate) and copolymers thereof.

13. The composite sheet material of claim 12 wherein at least 10% of said polyester fibers are shaped fibers with a scalloped-oval cross-section.

14. The composite sheet material of claim 11 wherein said moisture vapor permeable film is comprised of at least about 75% by weight of block copolyether esters.

15. The composite sheet material of claim 14 wherein said moisture vapor permeable film consists essentially of a copolyether ester elastomer.

16. An item of apparel comprised of the composite sheet material of claim 1.

17. A protective cover comprised of the composite sheet material of claim 1.

18. A method for making a moisture vapor permeable, substantially liquid impermeable composite sheet material comprising a fibrous nonwoven bonded with a powder adhesive and adhered to a moisture vapor permeable thermoplastic film, said method comprising the steps of:

(a) providing a first fibrous nonwoven web having a first side and an opposite second side, at least 90 weight percent of the fibers in said first fibrous nonwoven web being compatible with the adhesive;

(b) providing a second fibrous nonwoven web having a first side and an opposite second side, and abutting the first side of said second fibrous nonwoven web with the second side of said first fibrous nonwoven web, between 25 and 75 weight percent of the fibers in said second fibrous nonwoven web being compatible with the adhesive and the thermoplastic film, and between 75 and 25 weight percent of the fibers in said second fibrous nonwoven web being incompatible with the adhesive and the thermoplastic film;

(c) permeating the adhesive, in powder form, throughout said first and second fibrous nonwoven webs;

(d) heating said web to a temperature sufficient to melt the adhesive and powder-bond said webs such that the fibers of said first and second fibrous webs are bonded to the other fibers of such respective webs by the adhesive permeating said first and second nonwoven fibrous webs, and the first and second fibrous nonwoven webs are bonded to each other by the adhesive;

(e) melt extruding the moisture vapor permeable thermoplastic film onto the second side of said second fibrous nonwoven web to form composite sheet material;

(f) subjecting said composite sheet material to a confining pressure by passing said composite sheet material through a nip; and (g) collecting the composite sheet material onto a roll.

* * * * *